Dec. 31, 1957 A. W. RAFFERTY 2,818,091
LOADING VALVE FOR LIQUID FLOW CONDUITS
Filed June 6, 1955 5 Sheets-Sheet 1
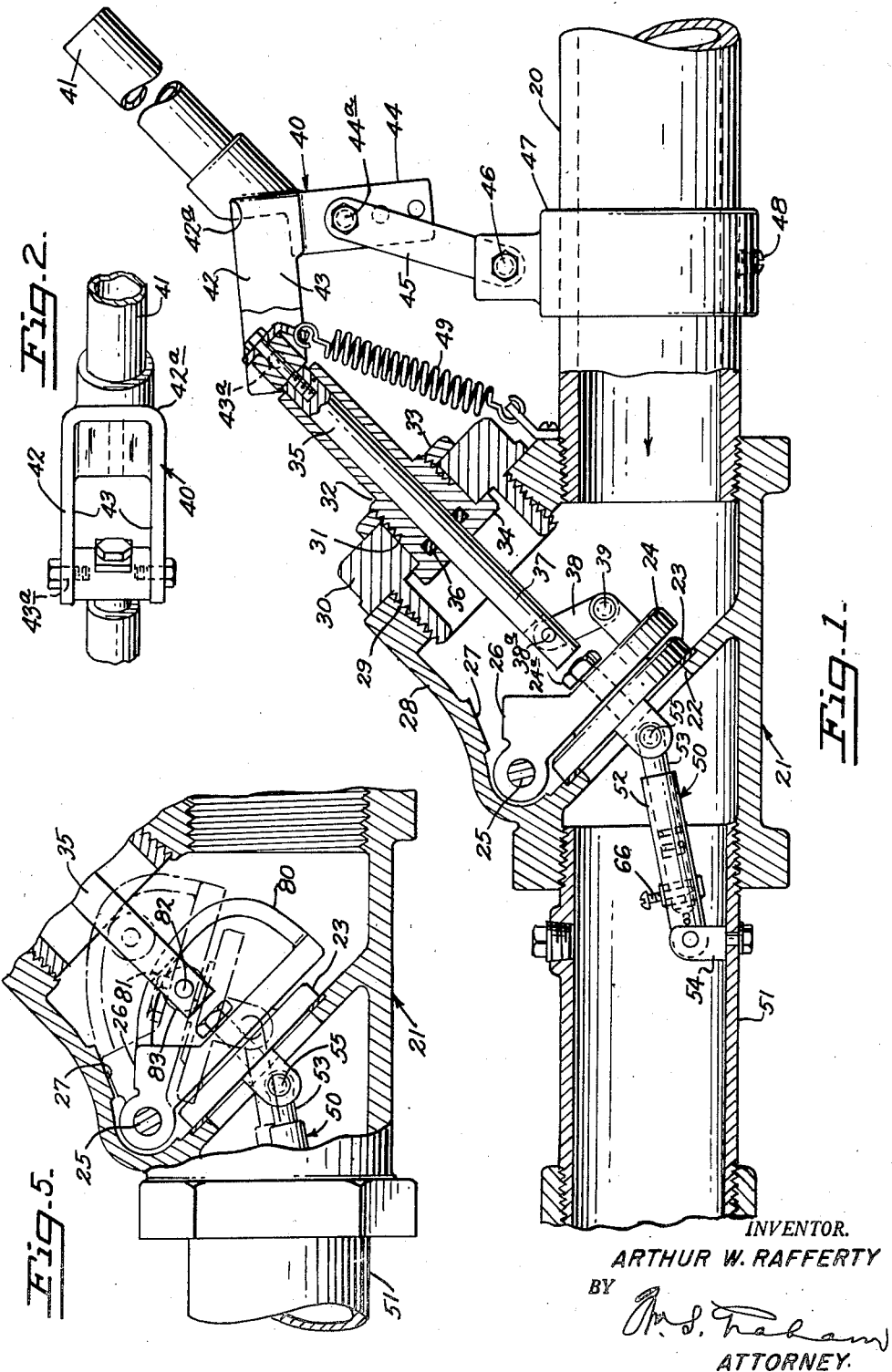
INVENTOR.
ARTHUR W. RAFFERTY
BY
ATTORNEY.

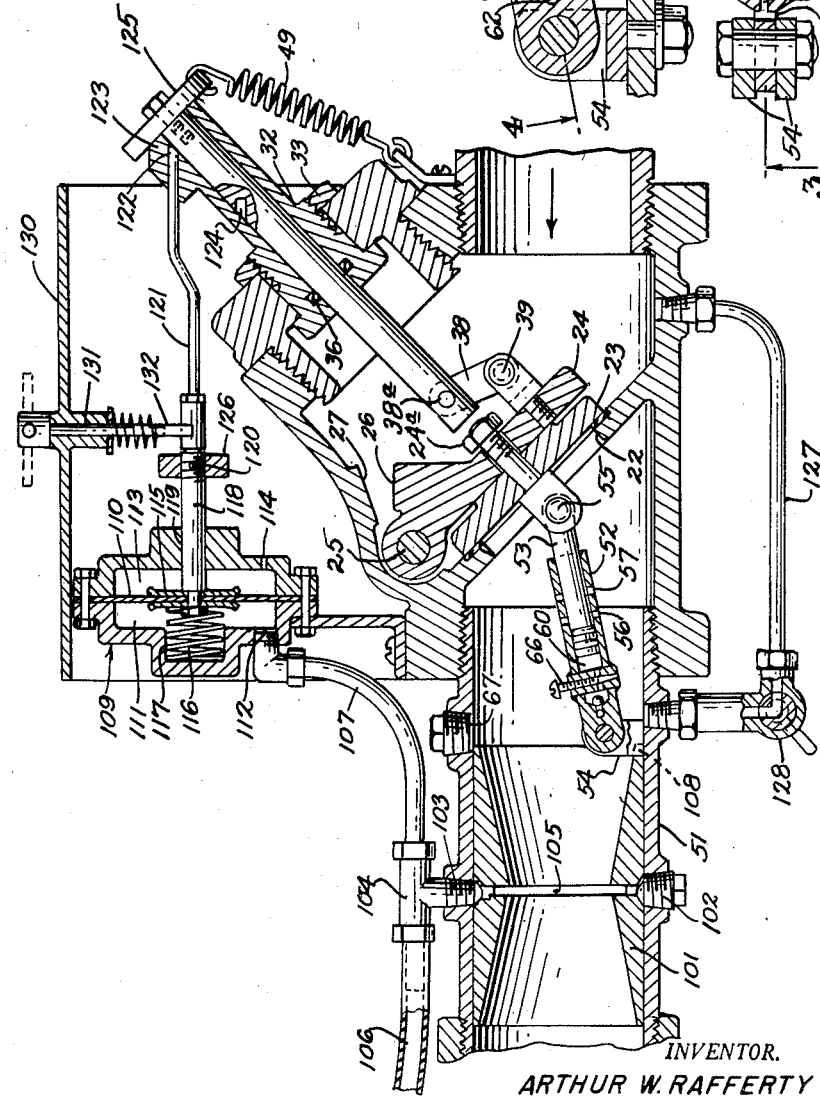

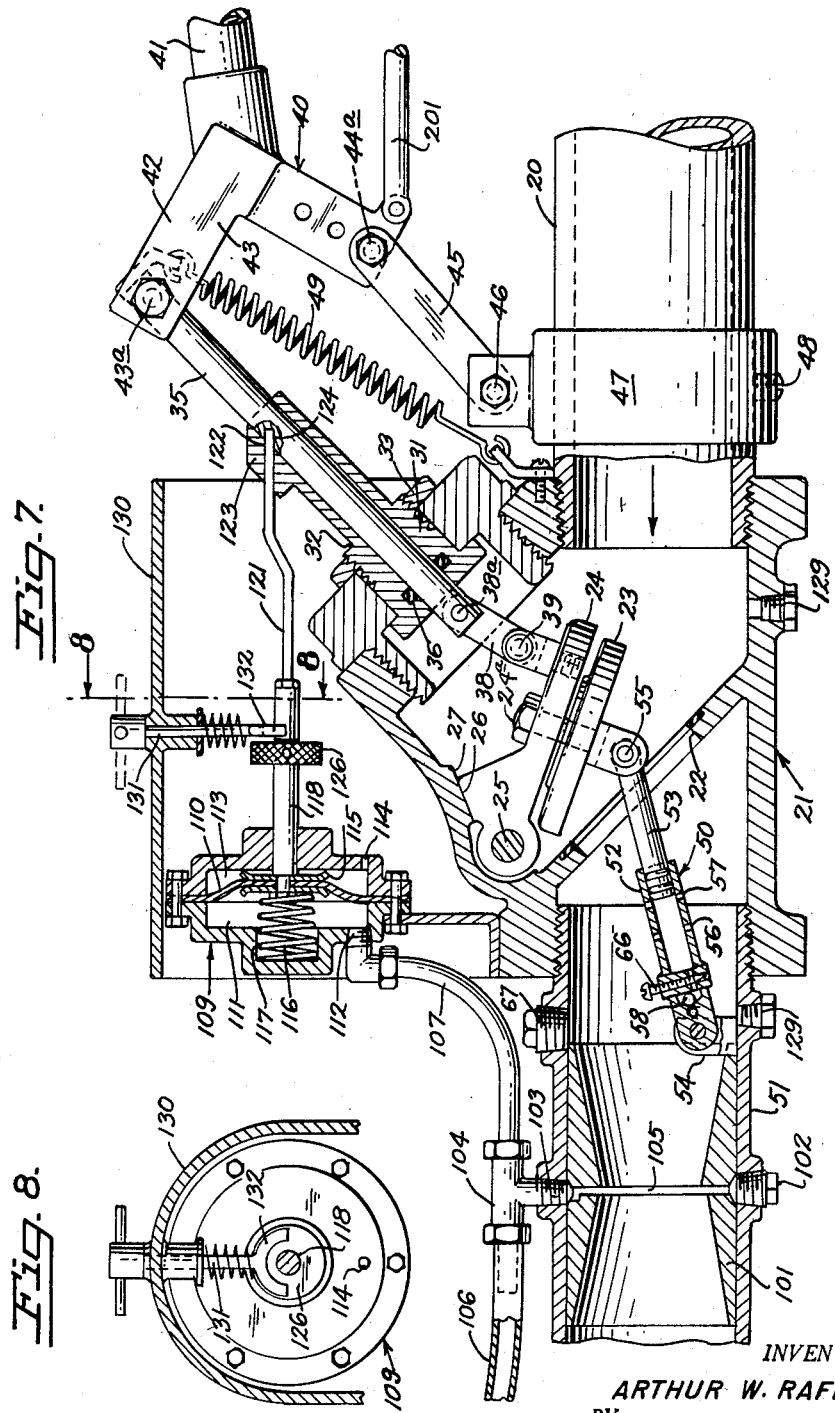

Dec. 31, 1957   A. W. RAFFERTY   2,818,091
LOADING VALVE FOR LIQUID FLOW CONDUITS
Filed June 6, 1955   5 Sheets-Sheet 4

Fig. 9.

INVENTOR.
ARTHUR W. RAFFERTY
BY
ATTORNEY

Dec. 31, 1957 A. W. RAFFERTY 2,818,091
LOADING VALVE FOR LIQUID FLOW CONDUITS
Filed June 6, 1955 5 Sheets-Sheet 5
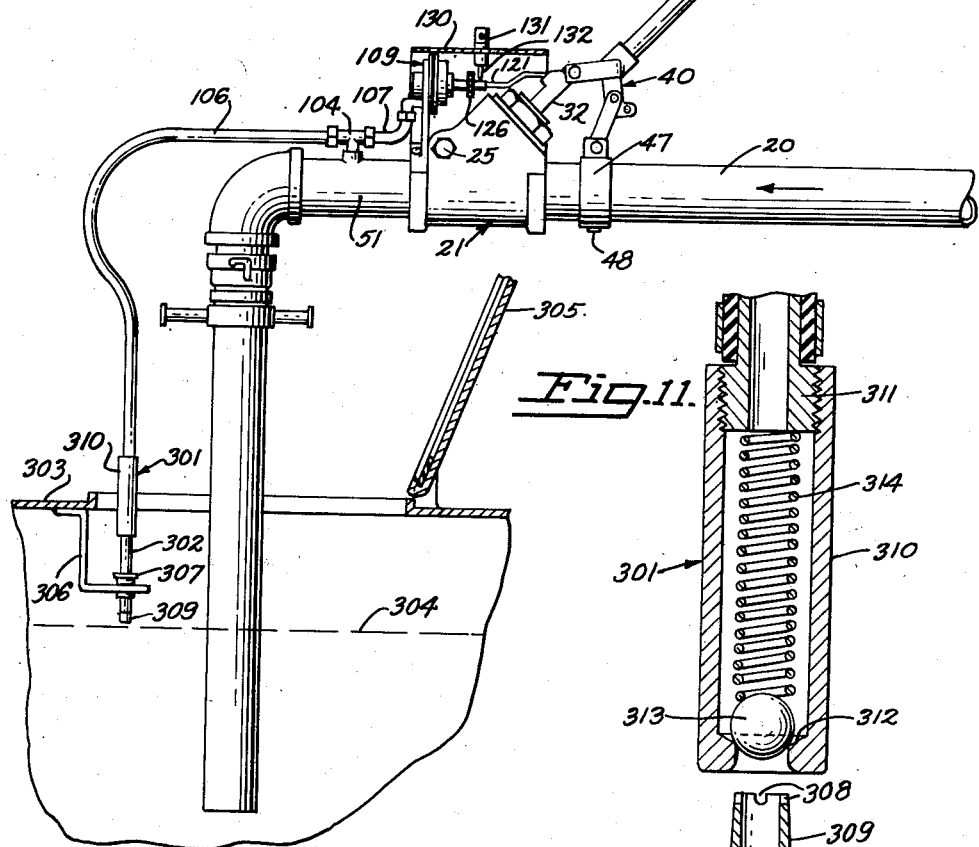
INVENTOR.
ARTHUR W. RAFFERTY
BY
ATTORNEY.

United States Patent Office 2,818,091
Patented Dec. 31, 1957

2,818,091

LOADING VALVE FOR LIQUID FLOW CONDUITS

Arthur W. Rafferty, Sacramento, Calif.

Application June 6, 1955, Serial No. 513,220

11 Claims. (Cl. 141—225)

This invention relates to loading valves for liquid flow conduits and more particularly to such valves having valve-controlling apparatus including means for providing a differential of speed of opening and closing the valve.

In conduits for conveying relatively large volumes of liquid at relatively high velocities and pressures which vary from time to time, there is always a problem in controlling the flow by means of a shut-off valve of any type because the pressure on the valve is responsive to flow of the liquid under pressure. The pressure is greatest at the initial opening and the final closing of the valve when there is a minimum size of open orifice of flow through the valve and the greatest area of valve surface is exposed upstream to the pressure of the liquid flow. Thus it is difficult, at relatively high pressures, to open the valve against the pressure, and at the final stage of closing of the valve there may be a hydraulic shock throughout the entire conduit system, which is damaging not only to the conduit system as a whole, but particularly to the pump, meters, strainers, valves and other facilities in the system. Since an operator may find it necessary to have a number of conduits flowing at one time a manual means for operation of the valve is provided, as well as an automatic means for closing the valve responsive to a predetermined level of liquid in a receptacle or tank being filled.

Basically the invention comprises a flow valve housing for mounting in a flow conduit, and any type of control flow valve therein which may be operated manually with no automatic control, and providing therewith a novel operating linkage means internally of the housing to obtain high leverage to open the valve at greatest leverage when most needed, namely, while initially lifting the valve from its seat against high pressure, and in controlling the final closing of the valve at which point the hydraulic shock is likely to occur, together with a hydraulic snubber for facilitating the gradual closing of the valve on high pressure flows. For manual operation a handle is provided having an independent leverage linkage adjustably variable. Means are also provided for closing the valve automatically responsive to a predetermined liquid level, and including manual means for closing the valve if any emergency conditions arise.

Preferred forms in which the invention may be exemplified are described herein and illustrated in the accompanying drawing in which:

Fig. 1 is a longitudinal central vertical section of the valve of the invention.

Fig. 2 is a fragmentary plan view of leverage yoke mechanism shown in Fig. 1.

Fig. 3 is a fragmentary enlarged longitudinal central vertical section of a hydraulic snubber member shown in Fig. 1 on line 3—3 of Fig. 4.

Fig. 4 is a fragmentary enlarged horizontal central section on line 4—4 of Fig. 3.

Fig. 5 is a fragmentary enlarged vertical view partly in section of a modified form of valve leverage mechanism.

Fig. 6 is a longitudinal central vertical section of a modified form of the valve of the invention.

Fig. 7 is a longitudinal central vertical section of another modified form of the invention.

Fig. 8 is a transverse fragmentary section on line 8—8 of Fig. 7.

Fig. 9 is a longitudinal central vertical section, corresponding in structural parts to Fig. 7, showing parts in varying operative position.

Fig. 10 is a schematic side elevation of the valve of the invention in relation to a flow conduit, receiving tank and an automatic closing coupler member.

Fig. 11 is a central longitudinal section of a coupler member automatically operative in controlling flow through the valve, enlarged in relation to Fig. 10.

Fig. 12 is a central longitudinal section of a filling level tube, enlarged in relation to Fig. 10, and, Fig. 13 is a fragmentary central longitudinal section of coupler and filling level tube in connected relation.

Referring to the drawings in which like reference characters indicate corresponding parts in the several views, and referring firstly to Fig. 1, the reference character 20 indicates any suitable type of liquid flow conduit having in the line of flow a closed valve housing 21 provided with a flow port and valve seat 22 which is disposed at an angle to the axis of said conduit, inclining rearwardly from top to bottom. Mounted to open and close the port is any suitable type of flow valve which is operative to open and close flow in the conduit line, the valve herein exemplified being a circular disc swing check valve 23; though a globe, poppet or cone valve would also be adaptable. The flow valve 23 is mounted centrally of the length of an arm 24, the arm swinging at one of its ends on pivot 25 which is adjacent to the periphery of the valve body 23, the arm 24 extending diametrally across the valve to its opposite periphery. The valve disc is mounted loosely on the arm by means of a bolt 24a, whereby it may find its own seat, though the arm and valve swing on pivot 25 as a unit. A shoulder portion 26 of the valve arm is positioned to contact a stop member 27 for limiting the opening of the valve.

The valve housing 21 has an outwardly and angularly laterally extended portion 28 having a relatively large opening 29 coaxial with the valve disc and threadedly closed by a bonnet 30 having a relatively smaller axial opening 31 through which is tightly mounted an elongated tubular shaft casing 32 having an enlarged end mounted axially through the bonnet 30 and securely stayed against movement by lock nut 33 which locks the flanged head 34 against the bonnet.

Within the shaft casing 32 is a reciprocable elongated operating shaft 35 sealed by a gasket 36 which is preferably a resilient O-ring, the inner end of the shaft extending into the valve housing as at 37. The shaft 35 is preferably coaxial with the swing check valve disc and its inner end is spaced from the valve. An elongated link 38 has at one of its ends a pivotal connection 38a to the inner end of the shaft 35, and at its opposite end has pivotal connection 39 to the swing check valve arm, substantially at the portion of the arm overlying the periphery of the valve which is opposite the pivot 25 on which the check valve and arm unit swings to open and closed position. The link 38 is of substantial length and disposed angularly to the axis of the shaft; wherefore, as the operating shaft 35 is pulled outwardly it provides a leverage on the arm 24 at the periphery of the valve disc opposite the pivot 25 and initially lifts the valve from its seat very rapidly and with relative ease, which is facilitated by the incline of the disc because the valve disc initially cuts across the pressure of liquid flow, rather than directly against the pressure of the liquid flow. Because of the combined factors of the length of the pivoted link, the attachment thereof at the periphery of the valve, and the pivotal mounting 25 at an opposite point of said periphery, the rapidity and the force exerted for opening the valve is greatest initially and decreases progressively proportionate to the extent that the valve is open and the link 38 becomes less angularly inclined relative to the axis of the shaft, as shown in Fig. 7. When the shaft is pushed inward a reverse of force and rapidity of closing is present, the valve being initially closed rapidly and the rapidity of closing decreasing progressively as the valve member approaches its seat, and finally becomes seated to close the valve. More briefly, the combination of the axial shaft, the peripheral connection of the pivoted elongated linkage, and the point of pivotal oscillation of the valve, are effective to graduate the opening and closing of the valve, opening it more quickly and easily initially and closing it more slowly finally, against the high pressures in the liquid line, the quick initial opening facilitating operation against the high liquid pressure, and the slow final closing cutting off the flow slowly and gradually and thus preventing hydraulic shock in the system.

In this form of the apparatus, as shown in Fig. 1, the valve is manually operated and the leverage for opening and closing is provided by means of a leverage linkage generally indicated 40 which is manipulated by a handlebar 41. More particularly, the leverage linkage includes a bell crank type of yoke 42, the angle of which has the handle connected thereto, as at 42a, a divided arm 43 of the bell crank yoke having pivotal connection 43a with the outer end of the valve shaft 35, and the other arm 44 having an adjustable pivot pin connection 44a to one end of an elongated link 45, said link having a pivot pin connection 46 at its opposite end to a lug at the outer circumference of a collar 47, the collar being slidably adjustable longitudinally of the conduit pipe 20 and anchorable by set screw 48, the bell crank yoke having a leverage fulcrum on pin 44a and the adjustability of link and collar being for varying the leverage in reciprocating the valve operating shaft 35.

This leverage of the bell crank 42 and the adjustable collar-linkage 45, 47, is so arranged that by appropriate upward and downward movement of the handlebar 41, the valve is selectively opened and closed by reciprocation of shaft 35, the leverage in the bell crank and its assembled linkage making the operation very easy even against the high hydraulic pressures usually employed in such conduit lines.

However, it is manifest that the valve should remain closed when it is not desired to flow liquid therethrough, and that the valve should close automatically in the event that an operator should carelessly leave his post or forget to manually close the valve. In such event the flow pressure of the liquid in the conduit should normally, and usually does, close the valve, if it is in flow. But as a precaution, in the event that the flow pressure is cut off further back or upstream from the valve, an automatically operative means is provided for such closing, comprising a tensioned coil spring 49 connected at its respective opposite ends between the valve housing and outer end of the valve shaft 35, and tensioned to move said shaft inwardly to close the valve, the linkage 38 providing for rapid initial closing and a delayed final closing when the valve is adjacently approaching its final seat, as previously described.

When extremely high hydraulic pressures are employed, which are becoming an increasing necessity to save time in modern loading and unloading operation of liquids, supplemental and ancillary means may also be provided for controlling the hydraulic shock due to closing the valve. As exemplified herein, such means comprises a hydraulic snubber device generally indicated 50, which is pivotally connected to the under or downstream side of the valve disc plate 23, preferably at the axial center of the plate. If the valve housing is of sufficient length at its discharge end, the snubber may be entirely housed therein, though for numerous reasons, including the adaptability of the valve for use in other forms and structures, it is preferred to extend the valve housing by connecting thereto a nipple 51 as an extension thereof at the discharge end of the housing.

The hydraulic snubber comprises a cylinder 52 and a piston 53 snugly reciprocable therein, the cylinder having one end pivotally connected in a nipple-extension, as by clevis post 54, and the opposite end of the snubber piston being pivotally connected at 55 centrally of the downstream or underside of the hinged valve plate disc 23.

For operation of the hydraulic snubber, means are provided whereby the opening of the valve plate disc 23 will assure priming of the snubber cylinder with liquid. The snubber cylinder 52 has small relatively spaced holes 56, 57 drilled therethrough which will be opened for inflow of the liquid when the piston is retracted by the opening of the valve and will be covered and sealed off by the excursion or movement of piston 53 as it descends into the cylinder during a closing operation of the valve. These holes may be varied in location when desired to permit quick closing of the valve disc plate. When the piston 53 is retracted from the cylinder tube by opening the valve, easy withdrawal thereof and priming of the cylinder are accomplished by the opening under low vacuum of a ball check valve 58 from its seat 59 thereby permitting fluid from the conduit to enter the cylinder chamber 60 through inlet opening 61 which communicates with the conduit 20 through transverse port holes 62. Fluid also enters the cylinder chamber 60 through a port 63 of a relatively small tubular adjustable valve 64 transversely across, and of lesser diameter than the cylinder chamber 60, the port 63 communicating with the cylinder chamber 60 through orifices 65. The port 63 and orifices 65 are adjustably controlled by a threadedly operated needle valve 66, the latter being adjustable through a plug opening 67 in the wall of nipple 51. The transverse valve body 64 also provides a cage in the cylinder to confine the ball check 58. After the piston 53 in its rise clears the holes 56, 57, fluid also enters cylinder 60 through those openings. Since, in handling volatile liquid products, it is desired to avoid possible high compression of air, any possible trace of air is purged from the snubber cylinder chamber 60, because the holes 56, 57 are in the upper portion of the cylinder chamber 60, and any possible entrained air rising to the top of the cylinder liquid would be ejected through the holes before actual pressure commences on the liquid contents of the cylinder chamber. The ball check 58 is maintained closely adjacent to its seat by the transverse valve 64 and becomes tightly seated by the piston pressure, after which the exhaust from the snubber cylinder is through the controlled orifices 65 and port 63 and thence into the main conduit line 20. It is to be noted that the valves 58 and 64 are beyond the excursion of the piston stroke and the orifices 56, 57 are within the range of such piston stroke. Thus, the hydraulic snubber may control the closing of the main flow valve 23.

In the modification shown in Fig. 5 a modified form of means is shown for providing a differential of leverage in opening and closing the valve 23, the remainder of the structure being similar to that shown in Fig. 1. In this modification, as shown in Fig. 5, there is an eccentric internal cam which is an internally irregular arcuate strip 80 having its opposite ends connected securely as by welding to the opposite end portions of the valve arm 24, and substantially in the plane of the inner end of the operating shaft 35, the inner end of the shaft being bifurcated or slotted as at 81 to slidably receive the cam strip therethrough, the side walls of the slot 81 having a bearing 82 mounted therein for a cam roller 83 which contacts against the eccentric internal face of the cam. The variation of curvature of the internal face of the eccentric cam is such as to vary the rapidity in opening and closing the valve plate disc and thus providing the greatest speed of movement at the initial opening, and a delayed final closing of the valve.

In Fig. 6 there is shown a modified form of the invention as hereinabove described, and in which there are means for holding the valve cocked open and subject to closing automatically responsive to a vacuum created by the flow of liquid in the main line 20. This form of device is especially effective in the event that an upstream valve fails in closing either automatically or manually, or a meter fails to register properly or is set incorrectly, or a tank to be filled already has an unknown quantity of liquid therein, or even if an operator at the upstream valve and meter makes an error or fails to make a proper cut-off of the liquid when the receiving tank is filled.

In this modification of Fig. 6 there may be identity of structure with the apparatus shown in Fig. 1 which includes the valve housing, the valve 23 and its mounting and leverage linkage to the operating shaft, and including the hydraulic snubber 50 and a modified form of nipple 51 at the discharge end of the valve housing.

In this modification of Fig. 6 there is a venturi member 101 mounted in the nipple 51 and secured therein by a plug 102 through the lower portion of the nipple wall and by an opposite engagement of tubular nipple 103 of the two-way tubular T connection 104, the purpose of which will be further described. The venturi member has an annular vacuum groove 105 immediately forward or downstream relative to its inner circumferential apex, which is its minimum inner diameter, for creating a vacuum responsive to the velocity flow in conduit 20. The nipple 103 communicates with the groove 105 for drawing a vacuum at appropriate times to be described. Vacuum tube portions 106 and 107 have relative communication through T member 104 and extend oppositely therefrom. There is no fluid flow through the opening for plug 102, its communication or tapping into the groove 105 being both to stabilize the nipple and to provide an opening into said groove so that a vacuum gauge may be connected therein when desired for testing the vacuum pull. In order that the venturi member may always be inserted in the nipple with the vacuum groove in the correct downstream direction relative to the venturi apex, the clevis post for the pivotal mounting 54 is positioned in the nipple so that a slot 108 in the proper end of the venturi will straddle the base of said clevis post in order to have a registered communication of the slot 105 with the nipple 103 and opening for plug 102.

The vacuum tube 106 is preferably flexible, or at least has a flexible free end portion which extends to a tank car or other receptacle which is to be filled, and its open end, or a suitable tubular connection thereto, terminates in such tank at the intended predetermined "filling limit" of such receptacle. If desired, such open end of the flexible vacuum tube 106 may have a self-closing coupler (see Figs. 10 to 13), to which further reference will be made herein, for which reason the tube 106 is designated as the second vacuum tube. The first vacuum tube designated 107 extends to and communicates with a generally circular diaphragm compartment or box indicated 109. This diaphragm compartment is hollow and has a resilient diaphragm 110, such as reinforced sheet rubber, stretched across it in the usual manner and tightly held at its edges against leakage, providing a chamber on each side thereof, one of which is a vacuum chamber 111 with which the vacuum tube 107 communicates, as at 112, the other chamber 113 having a vent 114 to atmosphere.

The diaphragm 110 is preferably centrally reinforced at both its faces by opposed reinforcing plates 115, preferably flexible, a lightly tensioned spring 116 being in the vacuum chamber positioned axially thereof in a recess 117, with its opposite end bearing against the adjacent reinforcing plate of the diaphragm for normally urging the diaphragm towards the venter chamber 113. At its axial central portion the diaphragm is connected to one end of a trip rod 118 which extends slidably through the wall of the diaphragm chamber as at 119, and the opposite end of which is connected, preferably by flexible joint 120, to a sear pin 121, the opposite or free sear end 122 slidably extending through an opening in a guide member 123 in the casing 32 of the operating shaft 35.

Referring now again to the operating shaft 35, it is provided in this modification with a sear socket 124 for receiving therein the terminal end 122 of the sear pin which is actuated into said socket by the resilient tension of diaphragm spring 116 when the operating shaft 35 is pulled or extended outward to register socket 124 and the sear pin. The end portion 122 of the sear pin may be longitudinally tapered, if desired, to facilitate its entry into and withdrawal from the sear socket 124. When the sear pin is released from socket 124 the liquid head pressure in the conduit 20 will close the valve, or if the conduit line 20 is not in operation and has no liquid pressure therein, the valve will be closed by the coil spring 49 which is then tensioned from the valve housing to a finger grip member 125, the latter being mounted at the outer end of the operating shaft 35 for purposes of manually extending the shaft to manually cock the valve open by means of sear pin 121 and socket 124.

While it is the intent and purpose of the form of valve apparatus of Fig. 6 that it shall be automatically operative to release the sear pin and close the valve responsive to a vacuum created by the venturi 101 and the diaphragm 110, it may be desirable, especially in an emergency, to close the valve independently and manually; wherefore means are also provided for manually releasing the sear pin from socket 124, so that the fluid pressure and spring 49 will close the valve. Such manual means may be relatively simple, and as here exemplified comprises a finger operated trigger disc 126 by which the sear pin may be manually reciprocated to disengage the socket 124.

The type of valve of Fig. 6 would usually be employed downstream relative to a meter and another flow control valve further upstream. Therefore, if the line is in operation at all, when the valve here described is closed, it will have the pressure against it of the upstream liquid which normally would be of sufficient pressure, with the relatively high pressures where this type of valve would be used, to negative the opening of the valve manually by the finger grip member 125. For this reason, there is provided a liquid by-pass tube 127 communicating with the conduit 20 on both sides, upstream and downstream, of the valve, the by-pass tube having any suitable cut-off 128 which, in normal operation, would be closed, and by which liquid pressure on the upstream side of the valve may be reduced or the pressure on both sides equalized so that the valve may be readily manually opened by fingergrip 125. While it is not necessary, in all operating structures of the valve, that the by-pass tube 127 shall be provided, it is preferred to incorporate connecting openings therefor into the structure, in the event its use is desired and such openings may be closed by threaded plugs 129 if not employed in the operation, as shown in Figs. 7 and 9.

As an incidental addition to the apparatus there is provided a covering or protective hood 130 to cover the operative mechanism of the diaphragm chamber and sear pin. Such hood may be of advantage for protection against rain, snow, dirt or injury. If such hood is employed, the trigger disc 126 may be operated therethrough by a rotatable key stem 131 having a two-arm yoke 132 which, when the key is turned, will contact with pressure against the trigger disc 126 to actuate it for manually removing the sear pin from the socket 124 in the same manner as though the trigger disc were manually operated directly.

In the operation of all the forms of the valve it is obvious that the conduit 20 empties its flow into a receptacle tank to be filled, assuming that the valve had been opened to permit such flow. In the forms of valves shown in Figs. 6, 7 and 9, the open end of the vacuum tube 106 is placed in the tank at a predetermined level to which it is desired to fill the tank, and the end of the tube is then open to atmosphere. The flow of liquid in conduit 20 sets up a vacuum at the annular groove 105 of the venturi, and since this groove communicates through nipple 103 with the vacuum tube 106, the opposite end of which is open to atmosphere, the vacuum is negatived and has no effect on the diaphragm chamber through vacuum tube 107, in which event the spring 116 by its bearing against the diaphragm 110 maintains the sear pin in the socket 124 to hold the operating shaft at an outward position and the valve is held open for flow. When, however, the receiving tank has become filled to its predetermined limit or level, the open end of the vacuum tube 106 will become immersed in the liquid and thus closed to atmosphere, whereupon the vacuum set up by the venturi groove will be exerted through vacuum tube 107 upon the sealed diaphragm chamber 111, thus actuating the diaphragm against spring 116 and drawing the sear pin out of socket 124; whereupon the fluid pressure in conduit 20 and spring 49 will close the valve, which, due to the linkage 38, as previously stated, is initially moved rapidly toward closing, and delayed at the final closing of the valve, the hydraulic snubber device 50 operating in the same manner as previously described.

It is not to be assumed that either the trigger disc 126 or this automatic closing of the valve is employed every time a tank or receptacle is filled. Normally there is another upstream valve and meter, and an operator, having set the meter for the intended quantity of liquid to be dispensed or flowed, will normally cut off that valve at the proper time, either automatically or manually.

In the modification illustrated in Fig. 7 there is shown the combination of the handle-operated simplified form of valve of Fig. 1 and the automatically vacuum-operated valve of Fig. 6, the illustration in Fig. 7 showing the valve at its open position, which would be common to all of the figures. Fig. 7 also discloses the collar 47 and link 45 at positions varying from the other figures to indicate the longitudinal adjustability of the collar 47 and link 45 for providing a variation of leverage which may be accomplished thereby.

The modification of Fig. 9 is to provide a fully automatic control valve which may be operated with the same type handle 41, bell crank 42, linkage 45 and collar 47, all as shown in Figs. 1 and 7. There is also incorporated therewith the valve structure, hydraulic snubber 50, venturi, vacuum means, and sear pin as shown in Fig. 2, the principal difference from the latter structure being the elimination of finger-grip disc 125 and substitution of the handle-bellcrank-leverage assembly indicated 40 to 47, an additional element being introduced by providing a suitable connecting means by which manipulation of the handle and bell crank leverage assembly will start or stop a remote pump (not shown) for selectively starting the flow system into operation or stopping such operation, such means being here exemplified as a rod or other connection 201 connected to the arm 44 of the bell crank lever and extending to any suitable switch of an electric motor which operates any suitable pump for flowing liquid in the conduit 20. With this modification of the apparatus, the normal and intended flow may be manually controlled entirely by the handle, since, assuming the system is at rest with valve closed and handle elevated, as shown in Fig. 9, the lowering of the handle as in Fig. 7 starts the motor by means of connecting rod 201, extends the operating shaft 35 to outward position which opens the valve and simultaneously raises the sear socket 124 to register with the sear pin, the spring 116 in the vacuum chamber actuating the sear pin into said socket. In this event the vacuum control function of the venturi 101 and vacuum chamber 111 become operative to automatically close the valve to prevent over-fill or overflow of the receiving tank, as previously described, and in such automatically closing of the valve (as also facilitated by spring 49), the handle is moved to upper position and thus opens the pump-operating switch, putting the system out of operation and stopping the flow. However, there may be various occasions or conditions when it would be desirable to close the valve manually by means of the handle independently of the vacuum means, in which event the sear pin may be released from socket 124 by means of trigger disc 126 whereupon the handle may be raised to close the valve manually as described relative to Fig. 1.

Since the valve of the present invention is especially useful in controlling high flow rate of expensive, volatile, inflammable fluids it is desirable to provide means for insuring against overflow, fire hazard, and the like, due to occasional failure or neglect by the human element, exemplified by failure to close the valve when the receiving compartment is filled, or omission to attach a bonding cable as an electrical ground against possible static sparks. Such a means is shown in Figs. 10 to 13, comprising a self-closing coupler 301 ancillary to the valve devices which employ the diaphragm compartment 109, as shown in Figs. 6, 7, and 9.

The self-closing coupler 301 is mounted at the free open end of the second flexible vacuum tube 106 for attachment to a filling level tube 302 which may be a permanent installation in any tank compartment to be filled, such as a tank, truck, shiphold, or the illustrated tank car 303, the proper predetermined filling level being designated 304, the level tube 302 being mounted within the tank closely adjacent to the hatch 305 in a bracket 306, and being adjustably mounted vertically therein by a tapered nut 307, so that one open end of the level tube may be at the predetermined filling level. The opposite end portions of the level tube 302 are preferably similar so that the tube may be reversed if one end should become burred or dented, each end having notches 308 inset therein to provide air passageways and being preferably conically tapered externally, as at 309. The self-sealing coupler 301 has a tubular casing 310 tightly connected, by coupling 311, to communicate with the end of said second flexible vacuum tube 106, the opposite open end of the coupler casing being flanged inwardly to provide a valve seat 312 for a spring loaded ball check valve 313, the ball check being normally maintained on its seat by a tensioned coil spring 314. The spring 314 is of sufficient tension to resist the opening effect on the ball check of any practical development of a vacuum, so that if the coupler valve 312—313 is closed, and an attempt is made to latch the flow valve open without first having attached the coupler 310 to the tube 302, all of the vacuum force of the venturi groove 105 is effective on the diaphragm 110 to withdraw the sear pin 122 from its pocket 123, thus closing the flow valve 23.

In the event that a carelessly connected coupler should work loose during a loading operation, or if a truck should be inadvertently moved and thus separate the coupling, the spring pressure on the ball check, cooperating with the tapered end of the level tube, is sufficient to completely separate the coupler from the level tube, thus causing the ball check to close off the inlet of the open end of the vacuum suction tube 106, and making the entire force of the vacuum effective on the diaphragm 110, thus closing the flow valve. The tapered end of the level tube facilitates the separation of the coupler from the level tube if there is a loose connection, though a tight connection may be made by pressing the coupling firmly upon the taper whereby the tapered end of the tube raises and maintains the ball check raised from its seat, and when so raised, a vacuum is effectively negatived by the notched openings 308 until the receiving compartment is filled to the predetermined level, at which time the opposite or free end of the level tube is closed by the liquid and the vacuum is effective in the same manner as though the coupler 301 were not employed in the system.

Having thus described the invention, what is claimed as new and patentable is:

1. A valve for controlling liquid flow in conduits comprising a valve housing having a ported valve seat, said valve housing being provided with a laterally extending portion having a relatively large opening, a closure bonnet nut therein having a relatively smaller opening therein, an elongated shaft casing having one of its ends securely mounted in said smaller opening and extending therefrom for slidably receiving an operating shaft therethrough, a flow valve member for opening and closing the ported valve seat, a valve operating shaft reciprocably slidable in said shaft casing, one end of which has a pivotal link connection between the valve member and the end of the shaft within the housing, spring means adapted to normally urge the flow valve to a closed position, and means at the opposite end of the operating shaft for reciprocating said shaft whereby the valve may be opened and closed.

2. A control valve for flow conduits as set forth in claim 1, and in which the valve member is a swing check disc pivotally mounted adjacent its periphery in said housing, and the pivotal linkage connection within the housing is between said shaft and the peripheral portion of the valve opposite the valve pivot, said valve housing having a by-pass tube communicating with the valve chamber upstream and downstream relative to the valve.

3. A flow valve apparatus for conduits as set forth in claim 1, including a valve arm pivotally mounted at one of its ends adjacent to the valve seat within the housing, the valve being a swing check disc mounted centrally intermediate the ends of said arm loosely for wobbling, the pivotal linkage connection within the housing between said shaft and the said arm being adjacent to the peripheral portion of the valve which is opposite said pivot of the valve arm.

4. A valve apparatus of the character described as set forth in claim 1, said spring means comprising a tension spring exterior of the valve housing and having one of its ends connected to the outer end of the operating shaft.

5. In a flow valve apparatus for conduits, a valve housing having a ported valve seat, a swing check flow valve member pivotally mounted adjacent its periphery for opening and closing the ported seat, a valve operating shaft reciprocably slidable through said shaft housing and having a sear socket intermediate its ends, one end of the shaft having a linked pivotal connection to the valve member adjacent its periphery and substantially opposite its aforesaid pivotal mounting, leverage means at the opposite end of the operating shaft for reciprocating said shaft whereby the valve may be opened and closed, an hydraulic snubber hingedly mounted at its opposite ends, one end of which is hingedly connected to the downstream side of the valve, a venturi for creating a vacuum source in the flow conduit forwardly of the flow valve responsive to the liquid flow, a spring actuated sear pin for entering the sear socket and locking said valve at an open position, and means for releasing said sear pin automatically responsive to said vacuum source.

6. A flow valve apparatus for conduits as set forth in claim 5, and in which the hydraulic snubber comprises a hydraulic cylinder and piston slidable therein, the cylinder having a check valve control inlet port and an adjustably controlled outlet port in the portion thereof beyond the maximum pressure stroke of the piston.

7. A valve apparatus of the character described as set forth in claim 5, the hydraulic snubber comprising a hydraulic cylinder and piston slidable therein, the cylinder having a check valve controlled inlet port and an adjustably controlled outlet port in the portion thereof beyond the maximum pressure stroke of the piston, and orifices in the cylinder wall within the excursion of the piston stroke.

8. A valve apparatus of the character described as set forth in claim 5, the said venturi having an annular groove adjacently forwardly of its inner apex and said releasing means having tubular communication with said groove.

9. A valve for controlling liquid flow in a conduit as set forth in claim 8, and in which there are a pair of tubular members communicating relatively and communicating with said venturi groove, the means for releasing said sear pin being automatically responsive to said vacuum source means through a first of said tubular members, the second of said tubular members having an extension for communication with the filling level of a receptacle into which the flow conduit discharges.

10. In a valve for controlling liquid flow in conduits, having a valve housing and a flow valve member therein, with means for locking said valve at an open position, the combination therewith of means for creating a vacuum in the flow conduit forwardly of the flow valve, a pair of tubular members communicating relatively and communicating with said vacuum source means, means for releasing said locking means automatically responsive to said vacuum source means through a first of said tubular members, the second of said tubular members having an extension for communication with a filling level tube in a receptacle into which the flow conduit discharges, and a spring-closed coupler valve member at the free terminal end of said second tubular member for connection to a filling level tube, the valves thereof being adapted for opening responsive to such connection.

11. In a flow valve apparatus for conduits, the combination as set forth in claim 10, said coupler member comprising a tubular cylinder body one end of which is tightly connected to said second vacuum tubular member, and the opposite end of which is open and has a ball-check valve, and a spring within the tubular coupler body for urging the ball check to a closed position, said ball-check valve being moved to an open position by connection of the coupler to the filling level tube.

References Cited in the file of this patent

UNITED STATES PATENTS

| | | |
|---|---|---|
| 226,119 | Schureman | Mar. 30, 1880 |
| 540,346 | Baker | June 4, 1895 |
| 915,624 | Perkins | Mar. 16, 1909 |
| 1,550,738 | Payne | Aug. 25, 1925 |
| 1,777,580 | Russell | Oct. 7, 1930 |
| 2,011,393 | Bradley | Aug. 13, 1935 |
| 2,354,209 | Hammand | July 25, 1944 |
| 2,661,136 | Huisman | Dec. 1, 1953 |
| 2,710,019 | Reasoner et al. | Jan. 7, 1955 |

FOREIGN PATENTS

| | | |
|---|---|---|
| 923,561 | France | July 16, 1947 |